United States Patent Office 3,263,211
Patented July 26, 1966

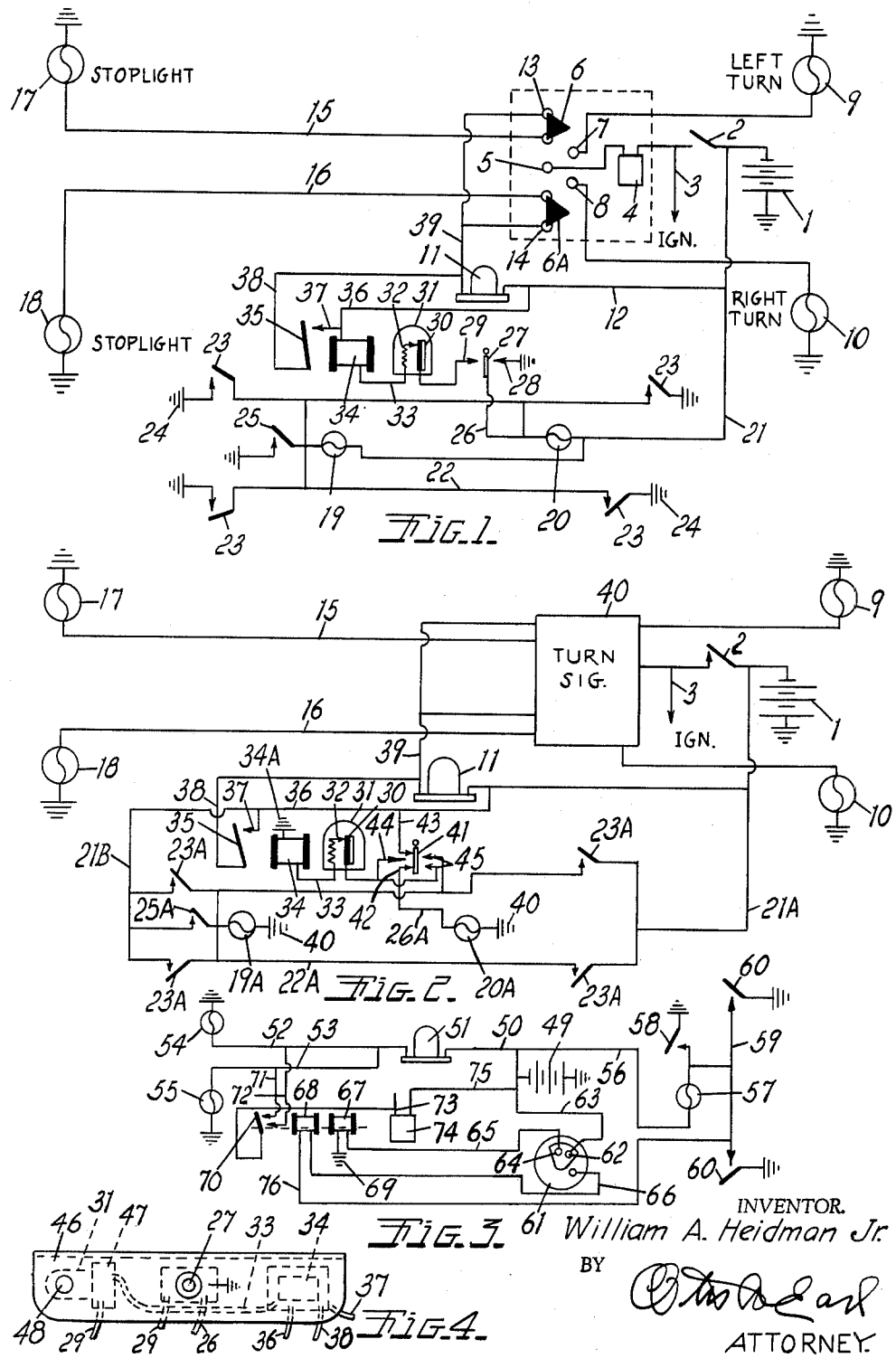

3,263,211
AUTOMATIC SAFETY FLASHER SIGNAL
FOR AUTOMOBILES
William A. Heidman, Jr., 1139 Lakeside Drive,
Grand Rapids, Mich.
Filed June 24, 1963, Ser. No. 289,868
5 Claims. (Cl. 340—81)

This invention relates to improvements in Automatic Safety Flasher Signal For Automobiles.

The principal objects of this invention are:

First, to provide an automatic safety flasher signal and circuit which will intermittently flash the rear stop lights of a vehicle whenever a door of the vehicle is opened thus automatically indicating the entrance or exit of passengers from the vehicle.

Second, to provide an automatic safety flashing circuit for the rear stop lights of an automobile which can be selectively connected to operate automatically when the doors or any door of the vehicle are opened or by manual switch without opening the doors of the vehicle.

Third, to provide a flasher signal circuit for the tail lights of an automotive vehicle which is activated from the interior dome or map light circuit found in most vehicles today and which will not interfere with the turn signal circuit as used in most automobiles.

Fourth, to provide a novel interrupter circuit as an attachment to existing automobiles which will permit the rear tail lights of the vehicle to be selectively actuated either by opening a door of the automobile or by turning on one of the interior lights of the automobile.

Fifth, to provide an automatic flasher circuit and control for automobiles which will permit the interior dome and map lights, sometimes referred to as courtesy lights, to continue to function upon opening the doors of the automobile and to selectively actuate the emergency tail light flasher when the doors are opened or not depending upon the desires of the operator.

Sixth, to provide a tail light flasher circuit which may be incorporated in the wiring system of automobiles or easily added as an attachment thereto which will utilize an inexpensive flasher lamp and other circuit elements for variably connecting the flasher circuit to the tail lights.

Other objects and advantages of the invention will be apparent from a consideration of the following description and claims. The drawings, of which there is one sheet, illustrate three practical variations of the emergency tail light flasher circuit and one mechanical assembly of an attachment for incorporating the circuits of the flasher system with the existing wiring circuit of most automobiles.

FIG. 1 is a schematic wiring diagram of a first form of emergency flasher control showing the connection thereof to the existing wiring system of an automobile including the turn signal wiring for the automobile conventionally illustrated.

FIG. 2 is a schematic wiring diagram of a varied form of the emergency flasher signal circuit adapted to operate and be regulated under slightly different circumstances than the circuit shown in FIG. 1 depending upon the desires of the user.

FIG. 3 is a schematic wiring diagram of a third form of emergency tail light flashing circuit incorporating an independent flasher and selective switch for conditioning the flasher circuit to operate under different conditions.

FIG. 4 is a front elevational view of an attachment for existing automobiles to permit the emergency flashing circuits shown in FIGS. 1 and 2 to be easily incorporated into existing automotive wiring circuits.

In FIG. 1 there are illustrated portions of the electrical wiring system of a vehicle including a battery 1 connected through an ignition switch 2 to a lead wire 3 to the ignition system of the vehicle. The ignition switch 2 when closed also energizes a flasher 4 for the turn signals commonly used on automotive vehicles. The flasher 4 is adapted to energize the center terminal 5 of a turn signal switch having selectively movable contacts 6 and 6a which are ganged together for movement from the neutral position shown into engagement with a left turn signal terminal 7 or a right turn signal terminal 8. The terminals 7 and 8 respectively energize the left front turn signal lamp 9 and the right front turn signal lamp 10. A stop light switch 11 actuated by operation of the vehicle brakes is connected by the conductor 12 to the battery either ahead of or behind the ignition switch 2 and when closed by operation of the brakes, the switch 11 energizes the terminals 13 and 14 in the turn signal switch assembly. When the turn signal switch is in neutral position as illustrated, the conductors 15 and 16 are both energized to the left stop light 17 and right stop light 18 respectively.

Most automobiles particularly of the passenger variety are also provided with interior lights such as the dome light 19 and a map or floorboard light 20, commonly referred to as courtesy lights, and these lights are energized through the conductor 21 usually connected ahead of the ignition switch 2 to the live side of the battery 1. A common ground return conductor 22 is connected to each of the courtesy lights 19 and 20 and extends to switches 23 which are operated by the doors of the vehicle, four switches being illustrated for a four-door automobile. Each of the switches 23 is adapted to ground the return conductor 22 as at 24 when any of the doors of the vehicle are opened. As is well known, this results in turning on the courtesy lights permitting easy entrance to or exit from the vehicle when the doors are opened.

In addition to the door operated switches 23, it is common to provide individual interior switches such as 25 for grounding the dome light 19 and map light 20 while the doors of the vehicle are closed.

Connected to the map light 20 in parallel with the normal ground return conductor 22 by a wire 26 is a manually operable switch having a single pole 27 selectively movable into engagement with the ground terminal 28 or the terminal 29. The switch 27 is preferably positioned in a convenient position on the dashboard for operation by the driver of the vehicle. The terminal 29 is connected to the bimetal element 30 of a self actuated flasher or interrupter bulb 31. Flasher bulbs such as the bulb 31 are commercially available items and contain a filament or other heating element 32 which is normally closed on the bimetal element 30 to provide contact and circuit through the bulb until heat from the element 32 deflects the bimetal element 30 sufficiently to break the circuit thus de-energizing the filament and interrupting the circuit through the flasher lamp. The filament 32 may be and is desired to glow and produce a visible signal of the operation of the lamp.

The terminal or lead wire from the flasher lamp 31 and the filament 32 is connected as at 33 to the coil 34 of a solenoid operated switch 35. The opposite side of the coil 34 is connected through the conductor 36 to the conductor 12 and the battery 1 ahead of the brake switch 11. The conductor 36 also has a terminal 37 against which the switch 35 closes when the coil is energized. The switch 35 is connected by the conductor 38 to the previously described stop light terminals 13 and 14 through the conductor 39.

From the foregoing description it will be apparent that if the single pole switch 27 is left in neutral position as illustrated, the stop light circuits and turn signal circuits of the vehicle will operate as they are normally designed to operate. Also the interior courtesy lights 19 and 20 will operate in the normal fashion by opening any of the doors thus closing any of the switches 23 or by manually closing the switch associated with the dome light 19 to the ground 25. It will also be possible to energize the map light 20 in much the same fashion by closing the switch 27 on the ground terminal 28 when desired. However, when the switch 27 is selectively connected to the terminal 29, the following condition exists. Negative potential is connected through the conductor 21, lamp 20, conductor 26, switch 27, terminal 29, flasher lamp 31 and conductor 33 to the coil 34. The coil 34 however is not energized as this negative potential from one side is opposed equally and oppositely by the same potential through the conductor 12 and 36. The coil 34 therefore remains de-energized and the switch 35, 37 remains in its normally open position. The brake switch 11 continues to function to actuate the stop lights in the usual fashion. If under these conditions the vehicle is stopped and one of the doors is opened preparatory to the entrance or exit of a passenger from the vehicle, a ground return is established through the switch 27, conductor 26 and the existing ground return circuit 22. This immediately creates a circuit from the conductor 12 through the coil 34 and interrupter lamp 31 to intermittently energize the coil 34. This causes intermittent closing of the switch 35, 37 and intermittent energization of the conductor 38, 39 to the stop light conductors 15 and 16. The rear stop lights thus flash intermittently giving a warning signal that persons are entering or leaving the vehicle.

The variation of the flasher signal circuit shown in FIG. 2 is applied to the same existing wiring elements of the automobile which are given the same reference numerals as in FIG. 1. The details of the turn signal circuit are illustrated only conventionally by the box circuit 40.

The door operated switches 23A are of a different form than in FIG. 1. Instead of grounding the courtesy light circuit at each switch, the switches make and break contact between two conductors connected thereto. Conductors 21A and 21B are live conductors continuously energized from the battery. Conductor 22A is connected to the dome light 19A of the courtesy light system. The light 19A and map light 20A have ground returns 40 to the battery instead of having the circuit grounded at the door and manual switches. This is a circuit used in some passenger cars.

The emergency flasher system of the invention adapted and connected to this courtesy light circuit and stop light circuit has the same solenoid 34, solenoid operated switch 35 and flasher bulb 31 as in the first circuit shown in FIG. 1 but is connected differently to accommodate the new circuit and also to provide somewhat different operating characteristics. A switch having an electrically isolated movable contact 41 is substituted for the switch 27. The contact 41 is movable to either side of a neutral position illustrated. In the neutral position, as well as in the left tilted position, the contact 41 engages a terminal 42 connected to the map light conductor 26A, and terminal 43 connected to the live conductor 36. This turns on the map light to the exclusion of the courtesy dome light 19A. If the switch is pushed to the left the contact 41 also energizes the terminal 44 and one side of the flasher bulb 31. The flasher bulb, conductor 33 and coil 34 form a coil circuit that is grounded at 34A. This gives the operator the option of turning on either the map light alone or in combination with the emergency flashing signal without opening any of the doors. When the switch contact 41 is moved to the right of neutral, the contact bridges and connects the terminals 45 connected to the courtesy light circuit 22A and the flasher bulb terminal 44. The flasher bulb is then energized automatically by closing of any door operated switch. A dome light switch 25A may be provided if desired but this energizes both the dome light and the flasher circuit when the switch 41 is in automatic flasher position. When the flasher bulb is energized from any of the sources described it intermittently energizes the solenoid that is grounded to open and close the switch 35 on live contact 37 and flash the stop lighs as in FIG. 1.

It will be noted that the alternate modes of operation of the circuits shown in FIGS. 1 and 2 are achieved by selectively connecting the terminals of the manual switch 27 or 41 and the solenoid operated switch 35 and coil 34 with one terminal of the flasher bulb 31 and the courtesy light circuit, map light circuit and ground. Either can be applied to standard existing circuits of automobiles as it is merely necessary to find and make electrical connections to opposite sides of the brake switch 11 and to the interior light circuit 22 or 22A and ground. All these circuits except the brake switch are commonly readily available at the map light switch of most vehicles. It is thus practical to provide the circuits shown in FIGS. 1 and 2 as an attachment such as is shown conventionally in FIG. 4.

In FIG. 4, a suitable mounting bracket 46 is provided for securing to the lower edge of the instrument panel of an automobile. The bracket 46 carries a suitable socket 47 on its rear side for mounting a standard flasher lamp 31 and a hole 48 may be provided in the bracket so that the operation of the flasher signal can be observed. The switch 27 shown is mounted on the back of the bracket and may be used in place of or in addition to an existing switch on the vehicle. The solenoid 34 and its relay switch are also mounted on the bracket with the lead wires extending therefrom as indicated. These lead wires can be connected easily into the circuits shown in FIG. 1. If the switch 41 of FIG. 2 is substituted, the additional leads from that switch in FIG. 2 would be available.

The circuit shown in FIG. 3 varies somewhat from the circuits shown in FIGS. 1 and 2 and no attempt has been made in FIG. 3 to illustrate the ignition circuit or the turn signal circuits but it is believed that they can be incorporated into the circuit shown with ordinary skill and reference to the circuits in FIGS. 1 and 2. In FIG. 3 the battery is indicated at 49 connected through the conductor 50 to the usual brake switch 51 and from the switch 51 through the conductors 52 and 53 to the rear stop lights 54 and 55. The interior courtesy light circuit of the vehicle is indicated at 56 connected to a single interior dome light or map light 57 with a manual control grounding switch 58 for turning on the light from inside of the vehicle. The courtesy light grounding circuit is shown at 59 with door operated switches 60 only two of which are illustrated as would be the case in a two door automobile. This common stop light and courtesy light system is modified by the present invention by the addition of a three position switch 61 which would be mounted conveniently to the driver's position of the vehicle. This switch may be in substitution for a similar single pole switch if the vehicle has one. The switch has one terminal 62 energized through the conductor 63 from the battery and a selectively operable connecting contact 64 adapted to connect the live terminal 62 to either the conductor 65 or the conductor 66 or to neither of these conductors.

The conductor 65 is connected to one coil 67 of a double coil solenoid having a second coil 68. The coil 67 is grounded at 69. Energization of either coil will close the moveable contact 70 of a solenoid operated switch on contacts 71 and 72 that are separately connected to the stop light circuits 52 and 53. The contact 70 is connected to the dead terminal 73 of a flasher unit 74. This may be the regular flasher unit existing in the car and is connected to the battery at 75. Thus energization of coil 67 will flash both stop lights independently of either the brake switch or the turn signal control. The switch 61 will override the turn signal but it is unlikely that the operator will want to use both signals at the same time. This condition of the system would be utilized in an emergency when the operator wished to leave the doors closed.

If the movable terminal 64 of the switch 61 is rotated to a second position to energize the conductor 66, the negative potential of the battery will be available at the coil 68 but there will be no ground return from this coil unless one or the other of the door switches 60 or the manual switch 58 are closed. In this latter condition the coil 68 will be energized and the switch 70–72 will be closed to provide a high amperage current from the flasher unit 74 and flash the stop lights as long as the coil 68 is energized. However, coil 68 will not be energized until one of the door switches 60 or the manual switch 58 is closed to ground the return conductor 76. This setting of the switch 61 would provide automatic flashing of the tail light or stop lights as a warning signal when the doors were opened for the entrance or exit of passengers.

If the switch 61 and its movable terminal 64 are rotated out of registry with the live terminal 62 it will be impossible to energize either coil 67 or 68 and close the switch 70–72 and this condition or setting of the switch 61 would be utilized by the operator under conditions in which it was desired to leave the doors of the vehicle open without having the warning flasher lights operating. Such conditions would exist when the vehicle was being parked, loaded or cleaned or merely parked with doors open in a position off of the highway where no warning signal was desired.

It will be noted that particularly the first two forms of the warning circuit illustrated utilize relatively inexpensive flasher lamps 31 to control a solenoid operated switch capable of passing the necessary amperage to effectively operate the stop lights as a warning signal. All of the circuits illustrated permit optional setting of the circuits for automatic operation of the warning flasher signals by the stop lights when any door of the vehicle is opened or alternatively to interrupt and prevent operation of the warning flashers when their operation would not be desired. Each of the circuits permits selective actuation of the warning flasher signals with the doors of the vehicle closed and each of the circuits can be applied to existing wiring circuits of automobiles with a minimum of connections and with a minimum of additional wiring as it is only necessary to make connections to the stop light circuit of the vehicle and to the courtesy light door switch operated circuit each of which circuits are usually readily available in existing automobiles. In each form of the circuit illustrated the necessary components for adding the warning flasher signal ability can be compactly mounted on a single unit and connected to the vehicle with a minimum of effort.

What is claimed as new is:

1. A warning flasher attachment for automobiles having a battery grounded on one side and brake switch operated stop light circuits and an interior courtesy light actuated by a door switch controlled ground circuit and a turn signal flasher and control connectable to the stop lights,
    said attachment including a bracket attachable to the instrument panel of the automobile in place of an interior courtesy light switch,
    a current interrupter mounted on said bracket and having a light emitting filament visible from the front of the bracket,
    a single pole double throw switch on said bracket and having a neutral open position,
    a solenoid including a coil and a normally open switch closed by energization of the coil mounted on said bracket,
    a ground terminal engageable in one position of said single pole switch,
    one end of said coil being connected to one side of said current interrupter,
    first and second lead wires extending from the opposite sides of said coil and said interrupter,
    third and fourth lead wires extending from the opposite sides of said solenoid operated switch,
    fifth and sixth lead wires extending from the pole and other terminal of said manual switch,
    said lead wires being selectively connectable to each other and to said stop light circuits and to said door switch controlled ground circuit to connect said coil and interrupter in series between the other terminal of said double throw switch and one side of said double throw switch and the ungrounded side of said battery ahead of said brake switch, and to connect the other side of said solenoid operated switch to said brake light circuits, and to connect said pole of said double throw switch to said courtesy light and door operated switch circuit.

2. In combination with the wiring system of an automotive vehicle having a battery,
    an ignition switch and relatively high amperage rear lights,
    a normal energizing circuit including a selectively operable brake switch connected to energize separate wires to said rear lights,
    a turn signal including a high amperage flasher and a manual switch arranged to selectively connect said flasher to one of said wires to one of said rear lights and disconnect said selectively operable switch from the other of said wires,
    a relay coil and a current interrupter connected in series therewith and having sufficient capacity to energize said coil,
    one side of said coil and interrupter series being connected to said battery between the battery and the ignition switch,
    a relay switch arranged to be closed by said coil and having one contact connected to said battery and having another cooperating contact connected to said separate wires to said rear lights through said turn signal and in parallel bridging relation to said selectively operable brake switch,
    and another selectively operable switch arranged to selectively complete the series circuit through said relay coil and current interrupter and said battery.

3. A combination according to claim 2, wherein said vehicle has a door; and switch means operable by said door and in series between said battery and said selectively operable switch for closing said series circuit when said door is opened.

4. In combination with the wiring system of an automobile having a battery connected to ground, a pair of stop lights energized from the battery through a brake operated switch, a turn signal assembly including a first flasher selectively connectible to flash either of said stop lights, and an interior light circuit including a lamp selectively connected to said battery through automatically operated door switches;
    an emergency warning flasher signal circuit connected to intermittently energize both said stop lights and including a solenoid operated switch adapted to directly connect said batter to said stop lights independently of said turn signal assembly and said brake switch and having a coil and coil circuit connected at one end to said battery and connected in series through a self-actuated current interrupter flasher lamp and a selectively operable switch, said last switch being adapted to alternatively connect the other end of said coil circuit to said interior light circuit between said lamp and said door operated switches to be connected to the other side of said battery along with said interior lamp or to disconnect said coil circuit from said interior light circuit;
    said interior light circuit including a permanent ground from said lamp and an energizing conductor connectible to the ungrounded side of said battery by said door switches in parallel;

said selectively operable switch having three positions to connect said coil circuit to said energizing conductor alone or to connect an interior grounded map light to said battery and said coil circuit or to connect said map light to said battery alone;

said coil circuit being connected to ground at its opposite end from said selectively operated switch.

5. In combination with the wiring system of an automobile having a battery and stop lights connected to be energized through a brake actuated switch and a turn signal switch and flasher selectively connectible from said battery to said stop lights in parallel with said brake actuated switch and an interior lamp connected to one side of said battery and having a lamp energizing circuit including plural door operated switches connected in parallel between said lamp and the other side of said battery, an emergency flasher warning signal system comprising a self-actuated current interrupting device connected to one side of said battery;

a flasher circuit connected to said stop lights between the lights and said brake switch and including a normally open solenoid operated switch;

coil means arranged to close said solenoid operated switch in said flasher circuit to the opposite side of said battery from said stop lights;

said current interrupting device being arranged to interrupt the flow of current through said flasher circuit; and a coil energizing circuit for said coil means connected to one side of said battery and including said coil and a manually operable switch;

said manually operable switch being adapted to connect said coil energizing circuit selectively directly to the other side of said battery or to said lamp energizing circuit between said lamp and said door operated switches;

said current interrupting device being connected on one side to said battery and on the other side to said solenoid operated switch; and said solenoid operated switch having two terminals connected separately to said stop lights and a common terminal connected to said other side of said current interrupting device.

References Cited by the Examiner
UNITED STATES PATENTS

| | | | |
|---|---|---|---|
| 2,650,354 | 8/1953 | Joiner | 340—63 |
| 2,935,730 | 5/1960 | Procter | 340—64 |
| 3,074,049 | 1/1963 | Saliba et al. | 340—81 |
| 3,185,961 | 5/1965 | Du Rosher | 340—81 |

NEIL C. READ, *Primary Examiner.*

T. A. ROBINSON, *Assistant Examiner.*